(12) United States Patent
Wang et al.

(10) Patent No.: US 12,153,121 B2
(45) Date of Patent: Nov. 26, 2024

(54) UNIFIED RADAR PERCEPTION ARCHITECTURE

(71) Applicant: GM Cruise Holdings LLC, San Francisco, CA (US)

(72) Inventors: Shaogang Wang, Pittsburgh, PA (US); Anton Mario Bongio Karrman, Los Angeles, CA (US); Brian Pierce, Trinity, FL (US); Kotung Lin, San Francisco, CA (US); Yun Jiang, Sunnyvale, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 353 days.

(21) Appl. No.: 17/591,335

(22) Filed: Feb. 2, 2022

(65) Prior Publication Data
US 2023/0243952 A1    Aug. 3, 2023

(51) Int. Cl.
*G01S 13/72*  (2006.01)
*G01S 13/931*  (2020.01)

(52) U.S. Cl.
CPC .......... *G01S 13/723* (2013.01); *G01S 13/931* (2013.01)

(58) Field of Classification Search
None
See application file for complete search history.

(56) References Cited

U.S. PATENT DOCUMENTS

| | | | |
|---|---|---|---|
| 2018/0188038 A1* | 7/2018 | Yang | G06V 20/56 |
| 2018/0190016 A1* | 7/2018 | Yang | G06V 20/58 |
| 2020/0104289 A1* | 4/2020 | Premawardena | G06V 20/56 |
| 2020/0300965 A1* | 9/2020 | Wu | G01S 13/931 |

* cited by examiner

*Primary Examiner* — Bernarr E Gregory
(74) *Attorney, Agent, or Firm* — Michael DiCato (57) ABSTRACT

The present disclosure is directed to combining the strengths of different methods of analyzing collected sensor data to updating a driving pattern of an automated vehicle (AV). This may include combining data from sets of data that track movement of objects over time with instantaneously received sensor data based on a series of steps that include accessing data that tracks the motion of objects in the field of view of a sensing apparatus, receiving current sensor data that includes a component of current or instantaneous object motion, and identifying whether controls of AV should be maintained or changed. When controls of the AV are maintained, an AV may be controlled to stay in driving in a same lane of a roadway at a same velocity. When controls of an AV are changed, changes may include applying, increasing a velocity, or altering the course of the AV.

18 Claims, 5 Drawing Sheets

UNIFIED RADAR PERCEPTION ARCHITECTURE

BACKGROUND

1. Technical Field

The present disclosure is generally related to evaluating sensor data from different perspectives. More specifically, the present disclosure is directed combining sensor processing techniques in ways that allow a controller of an automated vehicle (AV) to anticipate the movement of objects around the AV.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors, and radar elements disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The present disclosure is directed to combining the strengths of different methods of analyzing collected sensor data to reduce/mitigate the risk of an automated vehicle (AV) impacting an object. This may include combining data from sets of data that track movement of objects over time with instantaneously received sensor data based on a series of steps that include accessing data that tracks the motion of objects in the field of view of a sensing apparatus, receiving current sensor data that includes a component of current or instantaneous object motion, and generating a forecast of future motion of that object. This forecast may be based on an analysis that compares the data that tracks the motion of objects with the current sensor data as part of a process that generates a risk probability. When the risk probability meets or exceeds a threshold level, a corrective action may be initiated. Methods of the present disclosure may be performed at least in part by a processor executing instructions out of a memory.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Sensing apparatus used in an automated vehicle (AV) may receive data from radar sensors, camera sensors, Light Detection and Ranging (LiDAR) sensors or a combination of two or more of these sensors. A first way that sensor data is used is to collect and immediately evaluate sensor data to make a determination. For example, sensor data may be received that indicates that an object is located in a roadway immediately in front of a vehicle, and this information may be used to apply the brakes of a vehicle to avoid hitting the object. A second way that sensor data may be used is to accumulate sensor data, to evaluate that sensor data, and to use that sensor data to identify and track objects over time. In certain instances, the first way of using the sensor data is referred to as a top down use of sensor data and the second way of using sensor data is referred to as a bottom up use of sensor data.

A strength of the top down approach of sensor data analysis is that it has the ability to identify factors that may increase risk associated with movement of a vehicle very quickly, potentially using data that has a fairly high degree of accuracy or resolution. A limitation of the top down approach of processing sensor data is that this type of processing occurs very quicky—over short spans of time—without the ability of being able to review movement data associated with objects over longer periods of time. A strength to the bottom up approach is that it does track movement of objects over longer periods of time. A weakness of this bottom up approach relates to a limited ability to forecast rapid changes movement of an object, especially when that object has recently entered the field of view of an AV sensing apparatus.

New apparatus and methods are needed to leverage the strengths of different methods for processing sensor data.

The present disclosure is directed to combining the strengths of different methods of analyzing collected sensor data to updating a driving pattern of an automated vehicle (AV). This may include combining data from sets of data that track movement of objects over time with instantaneously received sensor data based on a series of steps that include accessing data that tracks the motion of objects in the field of view of a sensing apparatus, receiving current sensor data that includes a component of current or instantaneous object motion, and identifying whether controls of AV should be maintained or changed. When controls of the AV are maintained, an AV may be controlled to stay in driving in a same lane of a roadway at a same velocity, for example. When controls of an AV are changed, such a change may include one or more of applying brakes of the AV, increasing a velocity of the AV, or altering the course of the AV. Decisions relating to whether the controls of the AV should be made or changed may be based on a combination of longer term object tracking data and shorter term sensor data associated with an object. The controls of an AV may be changed when a risk associated with an object encountered on a roadway has reached a threshold level.

Figure 1:
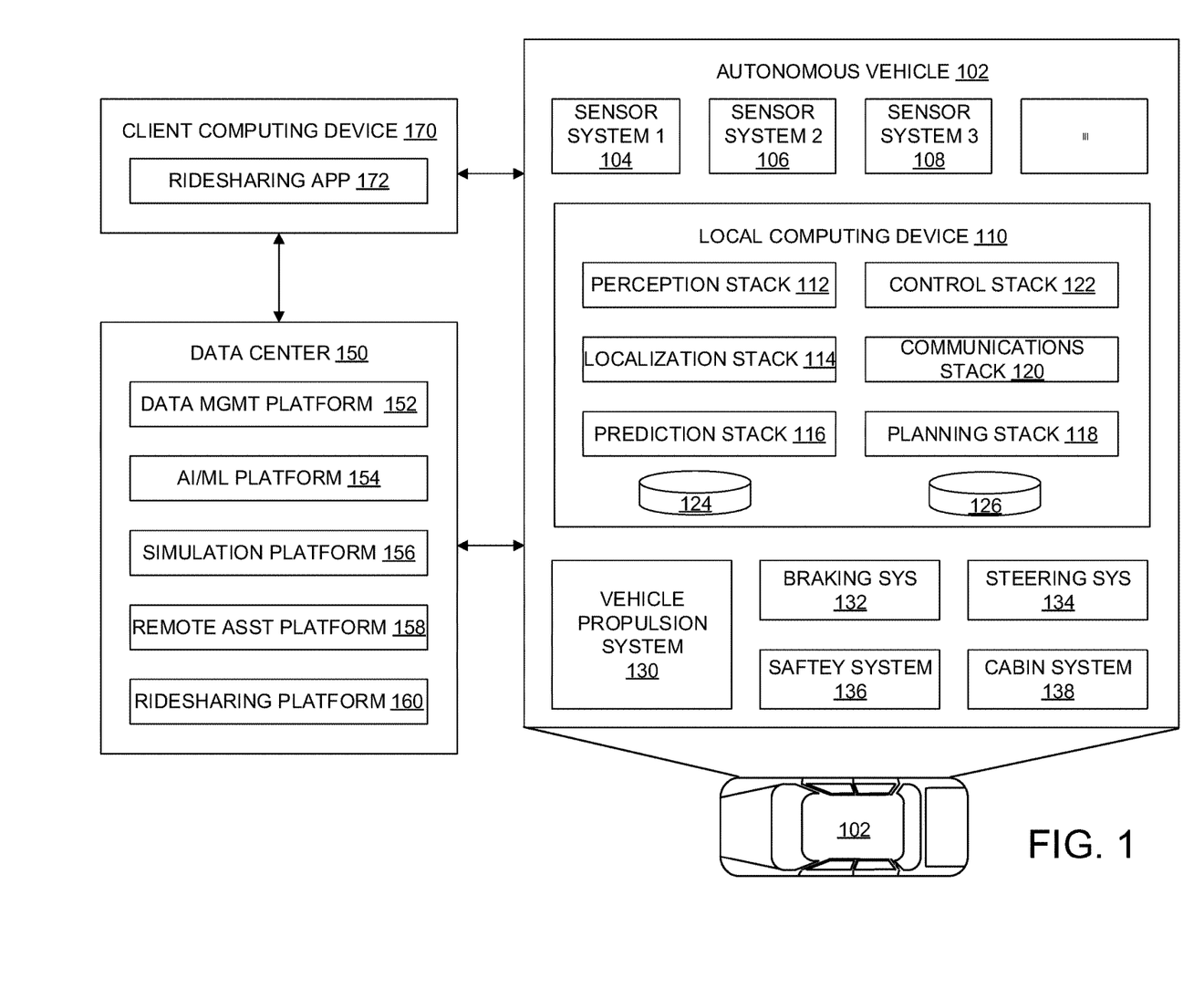
FIG. 1 illustrates an example of a system for managing one or more Autonomous Vehicles (AVs) in accordance with some aspects of the present technology.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE®), 5th Generation (5G), etc.), and/or other wireless network connection (e.g., License Assisted Access (LAA), Citizens Broadband Radio Service (CBRS), MULTEFIRE™, etc.).

The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Methods of the present disclosure may separate an area around the radar apparatus into a grid pattern that includes a plurality of cells. Objects tracked by one type of sensing apparatus (e.g. a camera and/or LiDAR apparatus) may be associated with particular cells of the grid and a processor that processes radar signal data may only process radar signals associated with the particular cells of the grid.

Figure 2:
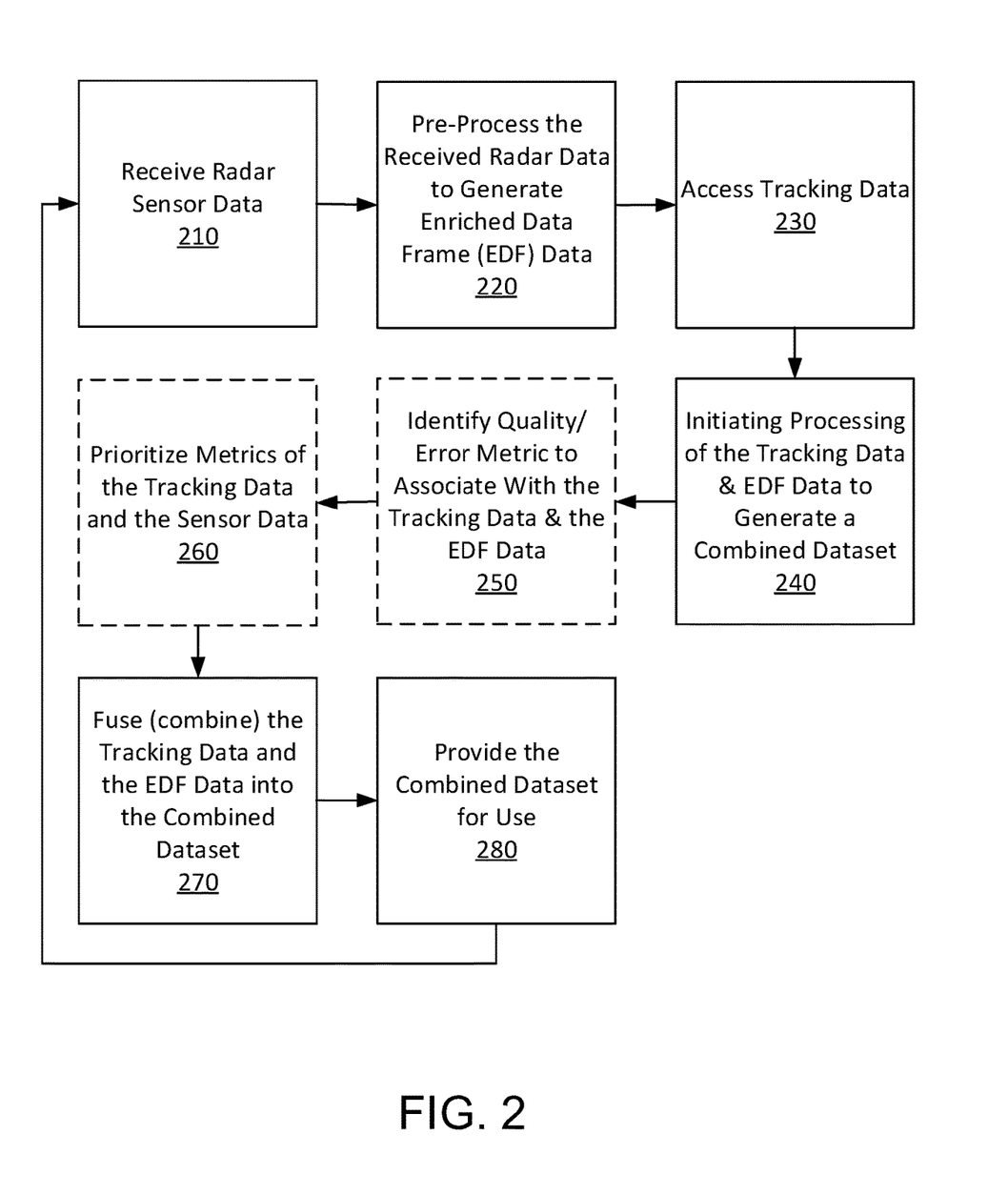
FIG. 2 illustrates a series of steps that may be used to evaluate and combine prior object movement data with data associated with current or recent kinematic object data.

FIG. 2 illustrates a series of steps that may be used to evaluate and combine prior object movement data with data associated with current or recent kinematic object data. FIG. 2 begins with step 210 where radar sensor data is received. This radar sensor data may be data associated with radar signals that were reflected off of objects that surround a sensing apparatus of a vehicle at a current sensing time. The data received in step 210 may be instantaneous motion data that was acquired within a time span associated with the transmission and receipt of one or more sets of radar signal before this instantaneous data is incorporated into a set of tracked data.

Next in step 220, the radar data received in step 210 may be pre-processed to generate enriched data frame data. The received radar data may include points of reflected radar energy where each point of the received radar data set are compensated for range-rate by the pre-processing that occurs at step 210 of FIG. 2. These enriched data frames may also identify a radar frame location relative to the chassis of an autonomous vehicle (AV) for each point of a radar point cloud associated with a current set of radar frame data.

Tracking data may then be accessed by a processor in step 230 of FIG. 2. This tracking data may include information that tracks the motion of objects around the AV over a time span that is longer than a time required to acquire one or a few samples of object related data from a conventional sensor. For example, this tracking data may track motion of an object over a time span longer than a few acquisition frames of a radar device. This tracking data may be information that associates objects with movement of those objects. The tracking data accessed in step 230 may be associated with information received from multiple types of apparatus or sensing modes of an apparatus (e.g., a radar apparatus, a camera, or a LiDAR apparatus or combination of these types of apparatuses). The tracking data may include information that identifies velocities, locations, or patterns of motion around a vehicle.

Next in step 240, processing may be initiated to combine the enriched data frame data and the tracking data into a combined dataset. This may include identifying quality or error metrics to associate with specific data points of the tracking data and the EDF data. The identification of these metrics may be performed based on a processor executing instructions out of a memory. A first quality metric may correspond to attributes associated with the tracking data accessed in step 230 and a second quality metric may be associated attributes associated with the enriched data frame data generated in step 220. Here the first quality metric may correspond to a number of points that are associated with a tracked object by the tracking data and the second quality metric may correspond to a number of points of the enriched data frame data. The more data points associated with a location or with an object may increase a level of certainty and decrease a level of uncertainty associated with data. For example, a set of object tracking data that includes one hundred data points may be considered more reliable (have a greater certainty) than another set of object tracking data that includes ten data points for a same underlying object. Furthermore, a set of enriched data frame data that does not match a known pattern (e.g., an odd shaped vehicle) may be considered less reliable than another set of enriched data frame data that matches a known pattern (e.g. a car or truck).

Error metrics identified in step 250 may correspond to an amount of variance associated the tracking data or the enriched data frame data. This variance may correspond to an amount of noise associated with particular types of data or with particular types of sensing apparatus. For example, a radar apparatus may be associated with greater noise levels than a camera or LiDAR apparatus. An amount of noise associated with a particular apparatus may change based on various factors. An amount of noise associated with a radar may increase when an amount of background radio frequency interference increases. An amount of noise associated with a camera or LiDAR may be increased when certain types of weather (e.g. fog, rain, snow, rain, or bright lights) are encountered.

Next in step 260, the quality and/or error metrics may be prioritized. This prioritization could include setting weights of respective sets of factors of the tracking data or the sensor data. For example, weights associated with a velocity, a distance, a direction, or an unusual pattern. Here a higher weight may correspond to a higher quality metric or a lower noise metric. As such, these weights may be proportional to the quality of a set of data, may be inversely proportional to an error (e.g. an amount of noise or uncertainty) associated with a set of data, or both. In certain instances, the prioritization may result in either the tracking data or the enriched data frame not being included in a determination when a weighting factor is set to zero, for example. Processing that includes evaluations using tracked data may be performed by a processor executing instructions of a "top down" detector, and processing that includes performing evaluations of the enriched data frame data may be performed by the processor executing instructions of a "bottom up" detector. In certain instances, data from a top-down detector process and a bottom-up detector process may generate redundant detections for a same object, processing of data associated with the top-down and bottom up detector may be used to remove redundant data (i.e., deduplicate data from a data set). This may include keeping data associated with a higher level of certainty than other data.

After step 260, metrics of the tracking data and the sensor data may be fused in step 270 of FIG. 2. This fusion may include combining data associated with the longer-term tracking data and the enriched data frame data. In certain instances, the prioritization performed in step 250 may result in either the tracking data or the enriched data frame data not being included in current evaluations of data associated with an object. For example, when a set of noise associated with a radar or another type of sensing apparatus is greater than a threshold level, weighting factors assigned to the longer term tracking data or the enriched data frame data may be set to zero such data associated with excessive noise may be ignored. Alternatively, data with less than a threshold level of quality may be assigned a low weighting factor or a weighting factor of zero. In another example, a noise level associated with a camera may be set at a high level when the camera encounters sunlight that saturates a sensor within the camera. In such an instance, tracking data associated with a camera may be ignored, yet tracking data associated with another type of sensor that is not affected by the sunlight may be assigned a greater weighting factor. The fusion of the tracking data and the enriched data frame data may, therefore, focus on a particular type of modality or sensing mode (e.g. radar instead of camera or visa versa) based on quality and/or error metrics. Tags may be associated with new detections of objects that have not yet been tracked and tags may be associated with objects that are already being tracked, these tags may be used by a process that tracks motion of objects. At a later time, these tags may be consumed by that tracking process when new detections are associated with previously untracked objects. This may result in data from newly identified objects being incorporated into a set of tracking data. Note the actions performed in step 250 and 260 of FIG. 2 are exemplary as the process of combining newly acquired data (e.g., the enriched data frame data) with tracked data may vary.

Next in step 270 the tracking data and the enriched data frame data may be fused (combined) into a combined dataset. This fusion of the tracking data and the sensor data may be based on the use of certain types of calculations. This process may include associating an object with factors of position and velocity, where some of these factors are derived from tracking data and others are derived from current or instantaneous data. This process may be referred to as combining observational-space and state-space data, and may include identifying a first set of factors from the tracking data (observational-space velocity data) and a second set factors of current or instantaneous data (state-space velocity data) from correlated sets of position and velocity where each of the first set of factors and the second set of factors may be assigned a variance that may be associated with a probability, an estimated error factor, or an uncertainty factor. This variance may correspond to a probability, an error or, an uncertainty of a position, direction, or velocity of an object. Evaluations may also be performed that identifies how tightly correlated the different sets of factors are. The more tightly correlated the two different sets of position and velocity factors are, will tend to lead to a higher confidence in correctly forecasting how an object will move in the immediate future. In certain instances, how tightly correlated the two different sets of position and velocity factors are may be identified by performing equations consistent with a covariance matrix.

After step 270, the combined dataset generated in step 270 may be provided for use by other computing processes in step 280. For example, a processor execution instructions used to track objects may access this combined dataset. This may allow a processor to more accurately track the motion of currently tracked objects based on the combined dataset including metrics of the enriched data frame data that have been fused with prior tracking data. The combination newly acquired data with older tracking data allows processing tasks that rely upon sensor data to perform evaluations using data associated with a greater certainty than methods that do not use such combined data sets. As such, the combined data set provided to a tracking process may allow a controller of an AV to operate more efficiently using more accurate data.

The fused data set generated in step 270 of FIG. 2 may improve operation of an AV controller, for example, when a motorcycle is driving in front of an slightly to the right of an autonomous vehicle (AV), a sensor system of the AV may have been tracking motion of the motorcycle for several seconds or at lease long enough for the sensor system of the AV to have identified the motorcycle as an object that will be tracked. The sensor system may accumulate tracking data associated with movement of the motorcycle and an observation-space velocity profile generated from the tracking data may indicate that the motorcycle is driving 3 meters in front of the AV and 1 meter to the right of the AV in a direction that parallels movement of the AV. As long as the motorcycle remained 1 meter to the right of the AV, the probability that the AV can pass the motorcycle without impacting the motorcycle would be relatively high. If, however, the motorcycle was to move abruptly to the left, the AV could impact the motorcycle. Of course, the likelihood of the motorcycle making such a move may be very low, even so, the sensor system at the AV may not be able to account for such a probability. This could lead to a conventional AV sensing system being involved in an accident that could have been avoided when methods of the present disclosure were used.

A sensing apparatus that combines both observation-space velocity profile data and state-space velocity data may be used to reduce the probability of the accident discussed above. Here, observation-space velocity profile data indicating that the motorcycle driving 3 meters in front of the AV and 1 meter to the right of the AV in a direction that parallels movement of the AV may be combined with state-space velocity data to identify a point in time when the probability of impacting the motorcycle increases. Such an increase in accident probability may be identified when evaluations of radar data received by the sensing apparatus identifies a change in a rotational velocity of the motorcycle toward the front of the AV. This identification could be made based on a movement of a front portion of the motorcycle toward the left and/or by identifying that a rear axle of the motorcycle has a component of rotational velocity toward the left. This could result in the AV sensing system sending a signal that results in the brakes of the AV being applied to avoid a possible collision with the motorcycle.

In certain instances, velocities of a tracked object may include different points that may move in a same direction with a same velocity or that may move in slightly different directions with different velocities. This is because an object may move only in one linear direction, may rotate, or may have motion that includes both linear and rotational components. Location data and velocity data associated with different points of an object may be used to identify whether an object is moving in a straight line, is rotating, or is moving in a direction while rotating. Rotational components of velocity may be identified by identifying that a first point and a second point of an object are moving with different velocities along vectors that may be in different directions.

Figure 3:
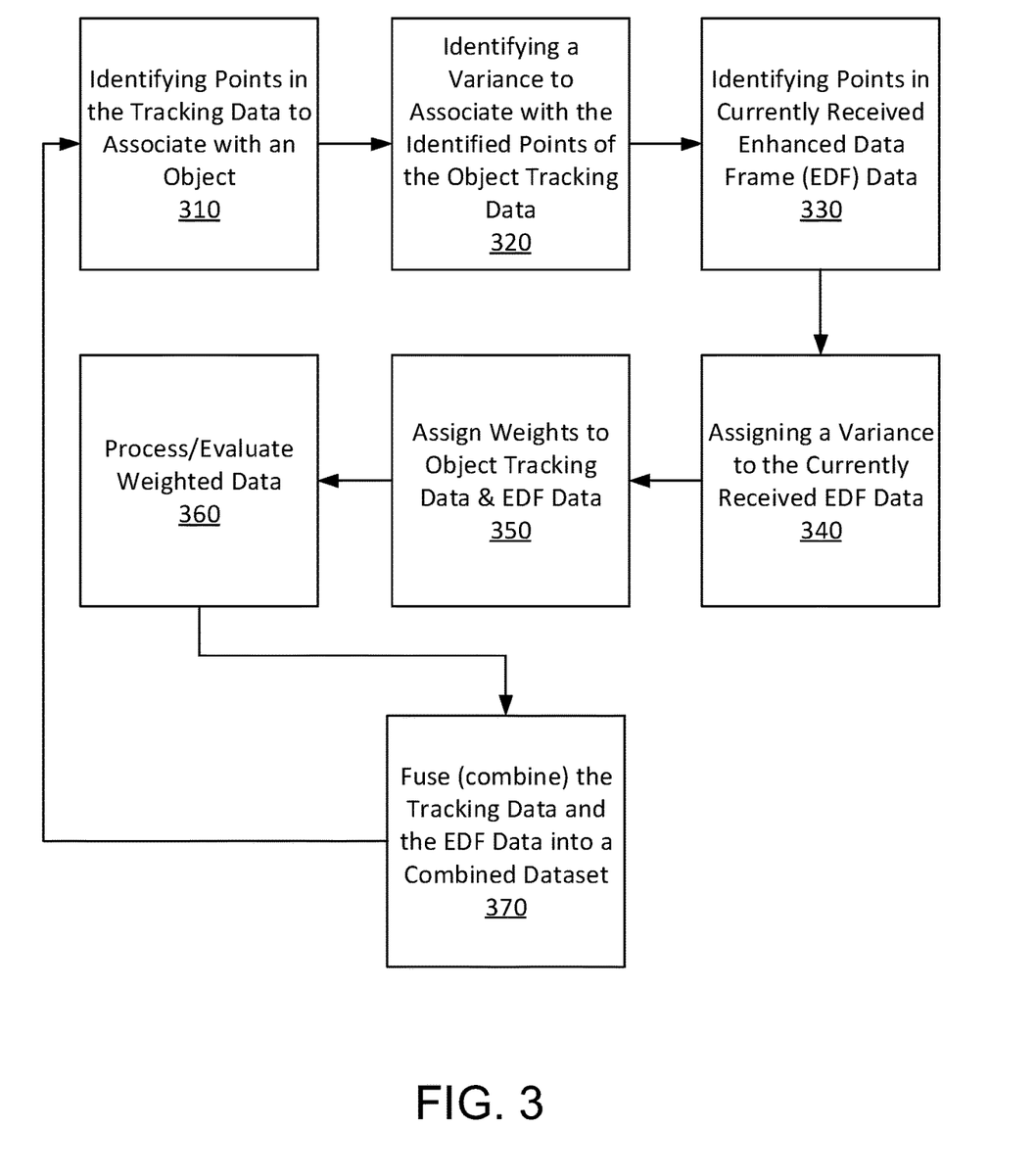
FIG. 3 illustrates a set of steps that may be performed by a sensor system of an automated vehicle when tracking data of an object are combined with recently received sensor data.

FIG. 3 illustrates a set of steps that may be performed by a sensor system of an automated vehicle when tracking data of an object are combined with recently received sensor data. The various steps of FIG. 3 may be performed by a processor executing instructions out of a memory when that processor evaluates the object tracking data and sensor data discussed above. FIG. 3 begins with step 310 where tracking data is evaluated to identify points that are associated with a tracked object. These points of tracking data may be used to identify motion of the tracked object that occur over a span of acquisition frames of a sensing apparatus. This tracking data may include LiDAR sensor data, camera sensor data, and/or radar sensor data that as noted above may be assigned a quality metric or an error metric. A variance may be identified in step 320 of FIG. 2. This variance may be decreased when a quality metric increases or may be increased when an error metric increases. As noted above a quality metric associated with an object may increase with a number of points in a set of tracked data that are associated with a tracked object.

After a sensor of a sensing apparatus senses one or more sets of current or recently received sensor data, that current or recent sensor data may be processed to generate enriched data frame data as discussed in respect to FIG. 2. The enriched data frame data may be evaluated to identify a number of points of that data that correspond to new detections or currently tracked objects in step 330. This sensor data used to generate the enriched data frame data may have been received after a radar apparatus transmits one or more sets of radar signals and receives reflections of those sets of radar signals. An object, such a bicycle may have numerous data points that each may be have a corresponding distance from an AV and a relative velocity as compared to the AV. Next, in step 340 of FIG. a variance may be assigned to the enriched data frame data. Like the variance discussed above, this variance may be decreased when a quality metric increases or may be increased when an error metric increases.

A first set of weights may be assigned to the object tracking data and a second set of weights may be assigned to the enriched data frame data in step 350. Here, these weights may be assigned in a manner that prioritizes how the tracked data and the current/recent sensor data are combined (fused), evaluated, or processed as discussed in respect to step 270 of FIG. 2. Processing of the weighted tracked data and the sensor data may be performed in step 360 of FIG. 3. After step 360, a fused dataset may be generated. As discussed in respect to FIG. 2, a combined or fused dataset may include tracking data and enriched data frame data. After step 370, program flow may move back to step 310 of FIG. 3 where the method of FIG. 3 may begin again.

The variances discussed in respect to FIG. 3 may be referred to as a first set of variances and a second set of variances. This first set of variances may include a probability factor, an error factor, or an uncertainty factor of a position, direction, or velocity of a tracked object. A processor executing instructions out of a memory at a sensing device may perform the steps of identifying observation-space data (i.e. tracked data) and state-space data (i.e. sensor data) and the related variances may be assigned by the processor based on an amount of noise (estimated, observed, and/or measured) affecting the sensing system or based on historical variance data. Noise and/or historical data associated with the observation-space data may be associated with environmental factors (e.g. smoke, fog, rain, or snow) or other factors (e.g. weighting factors discussed above).

A second set of variances may be assigned to the state-space data that may include a position and velocity of the object that was identified based on currently received data. This may include identifying or estimating a measure of linear velocity and/or rotational velocity. This second set of variances may include a probability factor, an error factor, or an uncertainty factor of a position, direction, or velocity of an object. The processor executing instructions out of a memory at a sensing device may perform the steps of identifying observational-space data and state-space data and the related variances may be assigned by the processor based on an amount of noise (estimated, observed, and/or measured) affecting the sensing system or based on historical variance data. Here again, noise and/or historical data associated with the observation-space data may be associated with environmental factors (e.g. smoke, fog, rain, or snow) or other factors (e.g. weighting factors discussed above).

After the observation-space and state-space data and related variances have been identified, a set of computations may be performed to forecast movement of an object. The computations performed may be applied to forecast how an object will move from a first position to a second position at a velocity. As discussed above, this may be based on different sets of factors and associated variances that again may include a probability factor, an error factor, or an uncertainty factor of a position, direction, or velocity of an object. These computations may include factors associated with observational-space and the state-space data discussed above. These computations may be performed by a processor executing instructions at the sensing apparatus.

When the processor identifies that the probability is above the threshold level a corrective action or a change to the driving controls may be initiated. This may include applying the brakes, as discussed above, or may result in a controller of the AV avoiding an object based on the forecasted direction and velocity of movement of the object.

After these computations are performed, a risk probability may be identified or assigned to forecasted motion of the object. The processor executing instructions out of the memory may then identify whether the probability is above a threshold level. Risk probabilities may vary based on a type of object, relative velocities between objects (e.g. the AV and a moving object), or other factors.

Methods of the present disclosure may include steps that include identifying a first location of a first point of the first object based on the processing of the sets of the reflected radar signals, identifying a second location of the first point of the first object based on the processing of the sets of reflected radar signals, and identifying a first velocity to associated with the first object based on the first point of the first object moving from the first location of the first point to the second location of the first point in a time frame. These methods may also include the steps of identifying a first location of a second point of the first object based on the processing of the sets of the reflected radar signals, identifying a second location of the second point of the first object based on the processing of the sets of reflected radar signals, and identifying a second velocity with the first object based on the second point of the first object moving from the first location of the second point to the second location of the second point in the time frame.

A linear velocity may be identified when a first velocity of a first point of an object matches a second velocity of a second point of the object. A rotational velocity may be identified when the first velocity of the first point of the object is different from a velocity of the second point of the object that is different from the first velocity.

In certain instances, velocities of a tracked object may include different points that may move in a same direction with a same velocity or that may move in slightly different directions with different velocities. This is because an object may move only in one linear direction, may rotate, or may have motion that includes both linear and rotational components. Location data and velocity data associated with different points of an object may be used to identify whether an object is moving in a straight line, is rotating, or is moving in a direction while rotating. Rotational components of velocity may be identified by identifying that a first point and a second point of an object are moving with different velocities along vectors that may be in different directions.

Methods of the present disclosure may include steps that include identifying a first location of a first point of the first object based on the processing of the sets of the reflected radar signals, identifying a second location of the first point of the first object based on the processing of the sets of reflected radar signals, and identifying a first velocity to associated with the first object based on the first point of the first object moving from the first location of the first point to the second location of the first point in a time frame. These methods may also include the steps of identifying a first location of a second point of the first object based on the processing of the sets of the reflected radar signals, identifying a second location of the second point of the first object based on the processing of the sets of reflected radar signals, and identifying a second velocity with the first object based on the second point of the first object moving from the first location of the second point to the second location of the second point in the time frame.

A linear velocity may be identified when a first velocity of a first point of an object matches a second velocity of a second point of the object. A rotational velocity may be identified when the first velocity of the first point of the object is different from a velocity of the second point of the object that is different from the first velocity.

Figure 4:
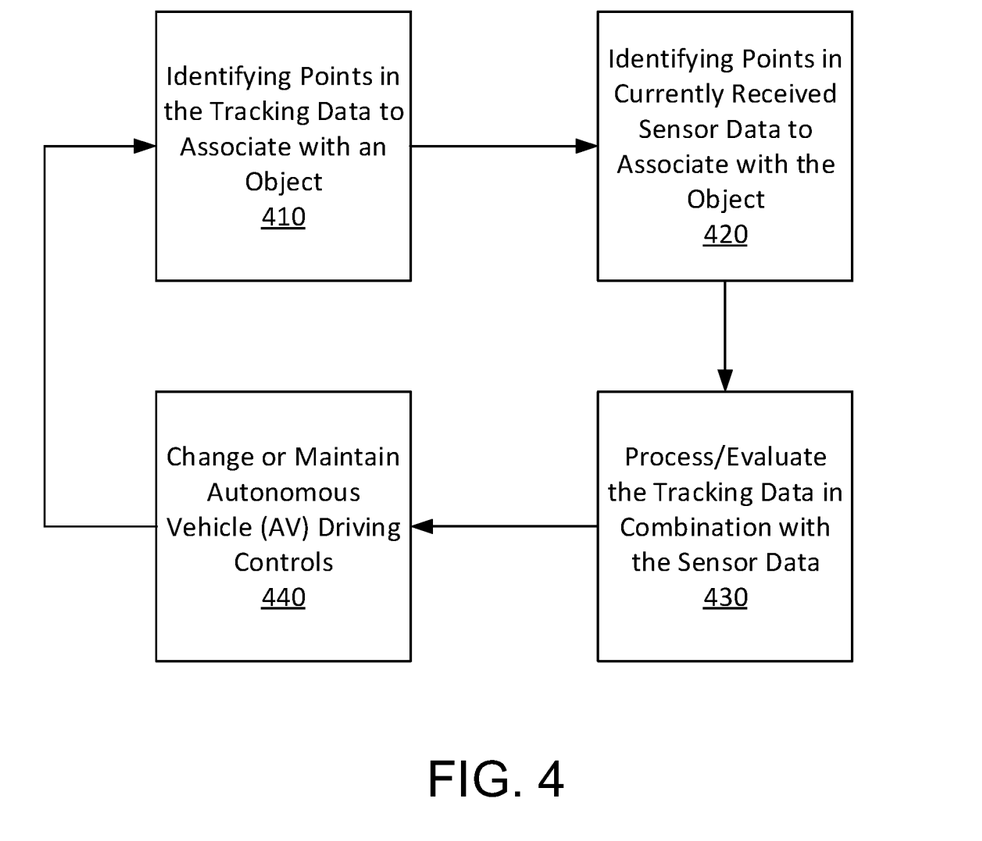
FIG. 4 illustrates another set of steps that may be performed by a sensor system of an automated vehicle when tracking data of an object are combined with recently received sensor data.

FIG. 4 illustrates another set of steps that may be performed by a sensor system of an automated vehicle when tracking data of an object are combined with recently received sensor data. The various steps of FIG. 4 may be performed by a processor executing instructions out of a memory when that processor evaluates the object tracking data and sensor data (enriched data frame data discussed above). The steps of FIG. 4 provide examples of how sets of combined data may be used by processes that are performed after (i.e., are downstream) of a sensing apparatus performs a first series of processing steps. FIG. 4 begins with step 410 where tracking data is evaluated to identify points that are associated with a tracked object. As discussed in respect to FIG. 3, points of a set of tracking data may be used to identify motion of the tracked object that occur over a span of acquisition frames of a sensing apparatus. This tracking data may include LiDAR sensor data, camera sensor data, and/or radar sensor data that as noted above may be assigned a quality metric or an error metric.

After a sensor of a sensing apparatus senses one or more sets of current or recently received sensor data, that current or recent sensor data may be evaluated to identify a number of points of that data that correspond (are associated with) to the tracked object in step 420 of FIG. 4. This sensor data may have been received after a radar apparatus transmits one or more sets of radar signals and receives reflections of those sets of radar signals. An object, such a bicycle may have numerous data points that each may have a corresponding distance from an AV and a relative velocity as compared to the AV.

Next in step 430 of FIG. 4, the points of the tracking data in combination with the points of the sensor data may be processed to identify whether a control of an automated vehicle (AV) should be maintained or changed in step 440. When the processor identifies that a change in the control of the vehicle should be performed, that change may be initiated in step 440. Otherwise the control of the vehicle will be maintained in step 440. Changes in control of a vehicle may include applying brakes, increasing a speed of the vehicle, or changing a current course of the vehicle. In this way, the steps of FIG. 4 may allow an AV to avoid a collision.

Figure 5:
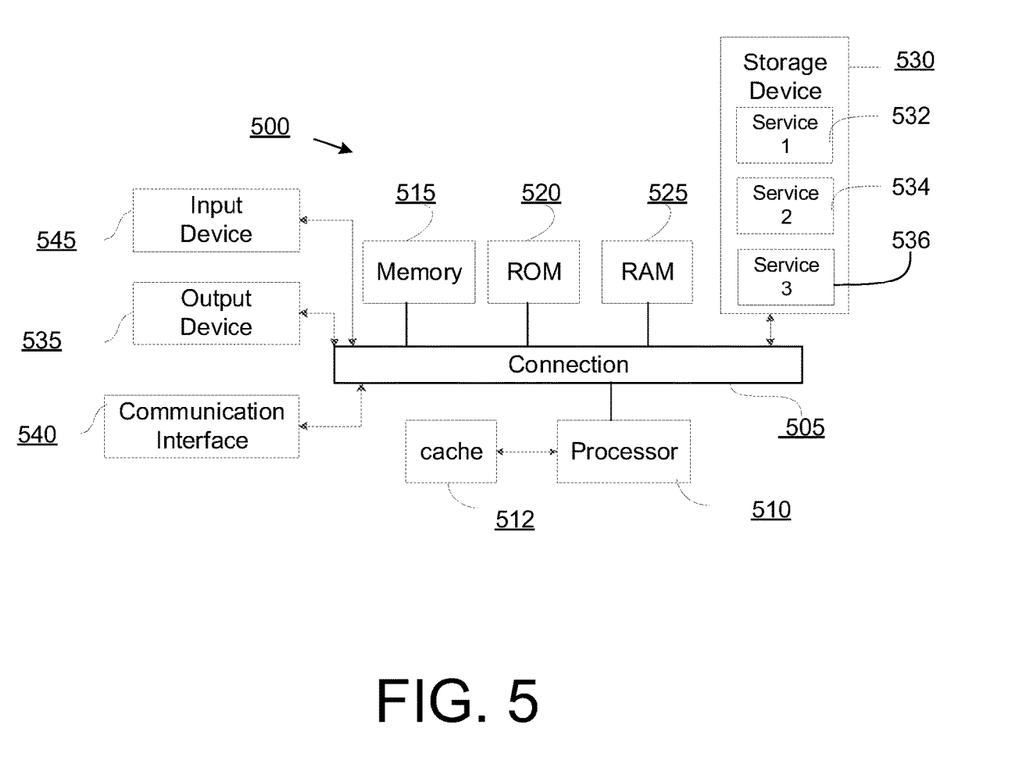
FIG. 5 shows an example of computing system 500 that may be used to implement at least some of the functions reviewed in the present disclosure in accordance with some aspects of the present technology.

FIG. 5 shows an example of computing system 500 that may be used to implement at least some of the functions reviewed in the present disclosure. In certain instances, a computing device may be incorporated into a sensing apparatus or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 542, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

What is claimed is:

1. A method for improving perception of a sensing apparatus, the method comprising:
   receiving radar sensor data associated with the current scene;
   generating enriched data frame data of the current scene from the received radar sensor data;
   accessing tracking data associated with a set of tracked objects;
   combining the tracking data associated with the set of tracked objects with the enriched data frame data of the current scene to create a combined dataset;
   providing the combined dataset for use by the sensing apparatus;
   identifying a first variance to assign to the tracking data; and
   identifying a second variance to assign the enriched data frame data.

2. The method of claim 1, wherein the first variance corresponds to a first estimated error associated with the tracking data and the second variance corresponds to a second estimated error associated with the enriched frame data.

3. The method of claim 1, further comprising:
assigning a first weighting factor to the tracking data based on the first variance; and
assigning a second weighting factor to the enriched data frame data based on the second variance.

4. The method of claim 3, wherein the first weighting factor and the second weighting factor are assigned values that are respectively inversely proportional to the first variance and the second variance, and processing of data points of the tracking data in combination with points of the enriched data frame data correspond to the values assigned to the first weighting factor and the second weighting factor.

5. The method of claim 1, further comprising:
identifying a number of the points of the tracking data that are associated with a tracked object;
identifying a number of points of the enriched data frame data that are associated with the tracked object;
assigning a first weighting factor to assign to the points of the tracking data associated with the tracked object; and
assigning a second weighting factor to assign to the points of the enriched data frame data associated with the tracked object.

6. The method of claim 5, wherein the first weighting factor and the second weighting factor are assigned values that are respectively proportional to the number of points of the tracking data that are associated with the tracked object and to the number of points of the enriched data frame data associated with the tracked object.

7. The method of claim 1, further comprising:
identifying that a pattern associated with a set of data points of the enriched data frame data is inconsistent with patterns associated with previously observed objects; and
assigning a quality metric to the set of data points associated with the pattern based on the pattern being inconsistent with the patterns associated with the previously observed objects.

8. The method of claim 1, further comprising identifying based on a priority of a quality metric associated with the enriched data frame data at least one of new data to include in the combined data set or redundant data that should not be included in the combined data set.

9. A non-transitory computer-readable storage medium having embodied thereon a program for implementing a method for improving perception of a sensing apparatus, the method comprising:
receiving radar sensor data associated with the current scene;
generating enriched data frame data of the current scene from the received radar sensor data;
accessing tracking data associated with a set of tracked objects;
combining the tracking data associated with the set of tracked objects with the enriched data frame data of the current scene to create a combined dataset; providing the combined dataset for use by the sensing apparatus; and
identify based on a priority of a quality metric associated with the enriched data frame data at least one of new data to include in the combined data set or redundant data that should not be included in the combined data set.

10. The non-transitory computer-readable storage medium of claim 9, the program further executable to:
identify a first variance to assign to the tracking data; and
identify a second variance to assign the enriched data frame data.

11. The non-transitory computer-readable storage medium of claim 10, wherein the first variance corresponds to a first estimated error associated with the tracking data and the second variance corresponds to a second estimated error associated with the enriched frame data.

12. The non-transitory computer-readable storage medium of claim 10, further comprising:
assigning a first weighting factor to the tracking data based on the first variance; and
assigning a second weighting factor to the enriched data frame data based on the second variance.

13. The non-transitory computer-readable storage medium of claim 12, wherein the first weighting factor and the second weighting factor are assigned values that are respectively inversely proportional to the first variance and the second variance, and processing of data points of the tracking data in combination with points of the enriched data frame data correspond to the values assigned to the first weighting factor and the second weighting factor.

14. The non-transitory computer-readable storage medium of claim 10, the program further executable to:
identify a number of the points of the tracking data that are associated with a tracked object;
identify a number of points of the enriched data frame data that are associated with the tracked object;
assigning a first weighting factor to assign to the points of the tracking data associated with the tracked object; and
assign a second weighting factor to assign to the points of the enriched data frame data associated with the tracked object.

15. The non-transitory computer-readable storage medium of claim 14, wherein the first weighting factor and the second weighting factor are assigned values that are respectively proportional to the number of points of the tracking data that are associated with the tracked object and to the number of points of the enriched data frame data associated with the tracked object.

16. The non-transitory computer-readable storage medium of claim 9, the program further executable to:
identify that a pattern associated with a set of data points of the enriched data frame data is inconsistent with patterns associated with previously observed objects; and
assign a quality metric to the set of data points associated with the pattern based on the pattern being inconsistent with the patterns associated with the previously observed objects.

17. An apparatus, the apparatus comprising:
a memory; and
a processor that executes instructions out of the memory to:
access received radar sensor data associated with the current scene,
generate enriched data frame data of the current scene from the received radar sensor data,
accessing tracking data associated with a set of tracked objects,
combine the tracking data associated with the set of tracked objects with the enriched data frame data of the current scene to create a combined dataset, and provide the combined dataset for further processing,
identify that a pattern associated with a set of data points of the enriched data frame data is inconsistent with patterns associated with previously observed objects, and assign a quality metric to the set of data points associated with the pattern based on the pattern being inconsistent with the patterns associated with the previously observed objects.

18. The apparatus of claim 17, wherein the processor executes the instructions out of the memory to:

identify a first variance to assign to the tracking data, and
identify a second variance to assign the enriched data frame data.

\* \* \* \* \*